(12) United States Patent
Linde

(10) Patent No.: US 11,122,649 B2
(45) Date of Patent: Sep. 14, 2021

(54) ELECTRICALLY HEATABLE LAYER STACK

(71) Applicant: AIRBUS OPERATIONS GMBH, Hamburg (DE)

(72) Inventor: Peter Linde, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 593 days.

(21) Appl. No.: 15/482,178

(22) Filed: Apr. 7, 2017

(65) Prior Publication Data

US 2017/0332443 A1 Nov. 16, 2017

(30) Foreign Application Priority Data

May 10, 2016 (EP) .................................... 16168951

(51) Int. Cl.
*H05B 3/14* (2006.01)
*H05B 3/26* (2006.01)
(Continued)

(52) U.S. Cl.
CPC .............. *H05B 3/145* (2013.01); *B32B 27/08* (2013.01); *B32B 38/0036* (2013.01);
(Continued)

(58) Field of Classification Search
CPC .......... H05B 3/145; H05B 6/46; H05B 3/267; H05B 1/0236; H05B 2214/04;
(Continued)

(56) References Cited

U.S. PATENT DOCUMENTS 6,541,744 B2* 4/2003 Von Arx ............. A47J 36/2483
219/544
9,994,324 B2* 6/2018 Hu ......................... B64D 15/00
(Continued)

FOREIGN PATENT DOCUMENTS

WO WO 2004/023845 A1 3/2004
WO WO 2007/089118 A1 8/2007
(Continued)

OTHER PUBLICATIONS

Park, Min Soon, "Aircraft De-Icing System Using Thermal Conductive Fibers", Mar. 2015, Embry-Riddle Aeronautical University (Year: 2015).*
(Continued)

*Primary Examiner* — Medhat Badawi
*Assistant Examiner* — Vicente Rodriguez
(74) *Attorney, Agent, or Firm* — Jenkins, Wilson, Taylor & Hunt, P.A.

(57) ABSTRACT

An electrically heatable layer stack is disclosed. The electrically heatable layer stack includes at least two substrate layers, and at least one carbon nanotubes-, CNT-, layer, which is arranged between the substrate layers and which is configured to conduct an electric current. The substrate layers and the at least one CNT-layer are configured to produce heating of at least one of the substrate layers when an electric current is applied to the at least one CNT-layer. A vehicle assembly group, an aircraft, a method and a system for manufacturing an electrically heatable layer stack are also disclosed.

11 Claims, 4 Drawing Sheets

(51) Int. Cl.
 H05B 6/46 (2006.01)
 B32B 27/08 (2006.01)
 B32B 38/00 (2006.01)
 B64D 15/12 (2006.01)
 H05B 1/02 (2006.01)

(52) U.S. Cl.
 CPC ............ *B64D 15/12* (2013.01); *H05B 1/0236* (2013.01); *H05B 3/267* (2013.01); *H05B 6/46* (2013.01); *B32B 2250/42* (2013.01); *B32B 2255/10* (2013.01); *B32B 2255/20* (2013.01); *B32B 2307/206* (2013.01); *B32B 2605/18* (2013.01); *H05B 2214/04* (2013.01)

(58) Field of Classification Search
 CPC ........ H05B 2203/005; H05B 2203/011; H05B 2203/013; H05B 2203/017; H05B 2214/02; B64D 15/12; B32B 38/0036; B32B 27/08; B32B 2605/18; B32B 2307/206; B32B 2255/20; B32B 2255/10; B32B 2255/42
 See application file for complete search history.

(56) References Cited

U.S. PATENT DOCUMENTS

| | | | | |
|---|---|---|---|---|
| 2007/0298253 | A1* | 12/2007 | Hata | B82Y 10/00 428/339 |
| 2009/0194525 | A1* | 8/2009 | Lee | H05B 3/145 219/553 |
| 2010/0218367 | A1* | 9/2010 | Feng | H05B 3/145 29/611 |
| 2011/0108545 | A1* | 5/2011 | Wang | H05B 3/283 219/546 |
| 2014/0070054 | A1* | 3/2014 | Burton | H01L 51/0048 244/134 D |

FOREIGN PATENT DOCUMENTS

WO  WO 2008/085550 A2  7/2008
WO  WO 2015/199785 A2  12/2015

OTHER PUBLICATIONS

A. James Clark School of Engineering, "The Weird World of 'Remote Heating,'" Materials Science and Engineering, http://www.mse.umd.edu/news/news_story.php?id=6398, pp. 1-3, Apr. 9, 2012.

Baloch, K.H., et al., "Remote Joule heating by a carbon nanotube," Nature Nanotechnology, vol. 7, No. 5, Apr. 8, 2012, pp. 316-319, XP055309423, GB ISSN: 1748-3387, DOI: 10.1038/nnano.2012.39 (2012).

Delmas, M., et al., "Growth of long and aligned multi-walled carbon nanotubes on carbon and metal substrates," Nanotechnology, vol. 23, No. 10, pp. 1-8, Feb. 24, 2012.

Extended European Search Report for Application No. 16168951 dated Oct. 19, 2016.

European Office Action for Application No. 16168951.8 dated Jun. 17, 2019.

* cited by examiner

ELECTRICALLY HEATABLE LAYER STACK

CROSS-REFERENCE TO RELATED APPLICATION

This application claims priority to European Patent Application EP 16 168 951.8 filed May 10, 2016, the entire disclosure of which is incorporated by reference herein.

TECHNICAL FIELD

The present disclosure generally relates to heating elements. The disclosure relates in particular to an electrically heatable layer stack. It further relates to a vehicle assembly group, an aircraft, a method and a system for manufacturing an electrically heatable layer stack.

BACKGROUND

Under normal travel conditions of a passenger aircraft, temperatures at an outside of the aircraft are often as low as minus 50 degrees Celsius. Without any counter-measures being taken, such temperatures may rapidly cause icing especially of those parts of the aircraft which are most exposed to the stream of ambient air, for example, the leading edges of the wings. However, ice build-up on the wing surfaces would undesirably influence the aerodynamic properties of the wing. In addition, movable parts, such as slats, which are used for steering the aircraft, are accommodated in the front portion of the wings. Icing in these areas could thus easily block the parts and inhibit proper functioning.

Various techniques have therefore been used to keep outer parts of an aircraft ice-free. Such techniques typically involve heating in some way the relevant areas to thereby prevent the forming of ice (so-called 'anti-icing') or remove existing aggregations of ice ('de-icing') by melting.

A known method of heating the leading edge of an aircraft wing is to guide hot air from an engine of the aircraft to the target areas. Bleeder air is guided through air pipes inside the wing and directed against an inside surface of the wing skin. Among other disadvantages of this technique, controlling and adjusting the temperature of the bleeder air as needed at the target areas is often difficult. Also, tapping bleeder air from the engine decreases the efficiency of the engine. In addition, the technique requires installation of air piping, nozzles and other devices inside the wings, which increases the weight of the aircraft. Furthermore, heating of the skin is caused by convection and at the inside of the skin whereas de-icing is required at the outside. Sufficient heat must therefore permeate the entire thickness of the wing skin. All this renders the technique little energy efficient.

An alternative method involves electric heating mats, which are attached along the inside of the wing skin. Compared to the use of bleeder air, this technique requires less weighty installations and allows for an easier control of the temperature. However, such heating mats still cause significant extra weight and require cumbersome inspection. Moreover, due to their installation at the inside of the skin, they too have the drawback of low energy efficiency for heating an outside of the skin.

Experiments have also been made with electrically heatable paint comprising carbon nanotubes, CNTs. However, such paint proved unsuited for the particular use on an aircraft, as it fails the requirements, for example, regarding wear, durability and inspectability.

Accordingly, a technique is desirable that avoids or mitigates the aforementioned disadvantages.

SUMMARY

According to a first aspect, an electrically heatable layer stack is provided. The layer stack comprises at least two substrate layers, and at least one carbon nanotubes-, CNT-, layer, which is arranged between the substrate layers and which is configured to conduct an electric current. The substrate layers and the at least one CNT-layer are configured to produce heating of at least one of the substrate layers when an electric current is applied to the at least one CNT-layer.

The substrate layers and the CNT-layer may be configured to produce the heating at least essentially by way of remote Joule heating. The remote Joule heating may be caused in the substrate layer. An amount of remote Joule heating in the substrate layer may exceed an amount of Joule heating in the CNT-layer, for example by a factor of 2 or more.

The CNT-layer may be configured to conduct the electric current in a plane of the CNT-layer. For example, the CNT-layer may be configured to conduct the electric current from a first side surface of the layer stack to a second side surface of the layer stack. The first and the second side surfaces may be opposite side surfaces of the layer stack. The plane of the CNT-layer may be parallel to a surface plane of each of the substrate layers which is adjacent to the CNT-layer.

The CNT-layer may comprise a mesh of mutually crossing carbon nanotubes, CNTs, which extend in the plane of the CNT-layer. For example, the CNTs may be distributed over the plane of the CNT-layer and/or the CNTs may be randomly oriented. In addition or as an alternative, an areal and/or a spatial density of the distributed CNTs and a length of the CNTs may be such that on average at least one contact exists between each CNT and at least one of its neighboring CNTs. At least some of the CNTs may be entangled CNTs. An average mesh size may be such that a resultant pattern of remote Joule heating in the substrate layer in combination with heat conduction in the substrate layer causes an at least essentially even temperature over a plane through the substrate layer.

The layer stack may further comprise at least one electrode configured for applying an electric current to the CNT-layer. The electrode may be formed at least essentially over the width of a side surface of the layer stack. The electrode may comprise an electroconductive film which is embedded at least partly in the layer stack. The layer stack may comprise two electrodes which electrically contact the CNT-layer. The two electrodes may contact the CNT-layer at least essentially at opposite side surfaces of the layer stack. The electrodes may be configured to become electrically connected to opposite poles of a current source.

The layer stack may further comprise a heat sensor. The heat sensor may be part of a control system for controlling a current that is applied to the electrodes of the layer stack.

The substrate layers may comprise electrically insulating material. For example, a substrate layer having a surface adjacent to the CNT-layer may be configured to electrically insulate the CNT-layer from an opposite surface of the substrate layer.

The substrate layers may comprise polymer resin. The polymer resin may be a thermoplastic resin. Alternatively, the polymer resin may be a thermoset resin. For example, each substrate may at least essentially consist of thermoplastic resin.

A thickness of at least one of the substrate layers may lie within a range of 0.05 mm to 1.0 mm. For example, a thickness of the substrate layers may lie within a range of 0.1 mm to 0.4 mm.

The layer stack may comprise a plurality of substrate layers and a plurality of CNT-layers. At least some of the substrate layers and some of the CNT-layers may be arranged alternately in the layer stack. The substrate layers may electrically insulate the CNT-layers from one another. Some of the substrate layers in the layer stack may not alternate with CNT-layers.

The layer stack may have a height in the range of 1 mm to 20 mm. For example, the layer stack may have a height in the range of 2 mm to 10 mm. A height of the layer stack may not be constant. For example, a height of the layer stack may vary between 2 mm and 10 mm. For example, a thickness of each layer may at least essentially be constant, whereas a number of layers in the layer stack may vary between different sections of the layer stack. For example, a number of layers in the layer stack may vary gradually between different sections of the layer stack.

According to a second aspect, a vehicle assembly group is provided. The vehicle assembly group comprises a layer stack as presently described. The vehicle assembly group may comprise at least parts of a skin of the vehicle. The layer stack may form an outside surface of the skin of the vehicle and/or be arranged close to an outside surface of the skin of the vehicle.

The vehicle assembly group may be an aircraft assembly group. Also, the vehicle assembly group may comprise at least parts of a wing of an aircraft. The layer stack may be arranged at least partly in a region corresponding to a leading edge of the wing of the aircraft. The layer stack may extend at least essentially over a length of the wing. Alternatively, the vehicle assembly group may comprise at least parts of a fuselage and/or a tail fin of an aircraft.

According to a third aspect, an aircraft is provided. The aircraft comprises a vehicle assembly group as presently described. For example, the aircraft comprises at least two vehicle assembly groups each of which comprises at least parts of a different wing of the aircraft.

According to a fourth aspect, a method for manufacturing an electrically heatable layer stack is provided. The method comprises providing a first substrate layer and spraying, onto the first substrate layer, a dispersion comprising a dispersing agent and carbon nanotubes, CNTs, in dispersed state. The method further comprises removing the dispersing agent from the sprayed-on dispersion such that a CNT-layer configured to conduct an electric current is formed on the substrate layer. The method further comprises providing a second substrate layer, and laminating the second substrate layer onto the CNT-layer.

The method may further comprise, subsequent to providing the first substrate layer, laminating the first substrate layer onto a base structure. Additionally, spraying the dispersion may be performed at least partly in synchrony with laminating the first substrate layer. In addition or as an alternative, the method may be performed repeatedly, for example, in an iterating manner, to produce a layer stack having a plurality of CNT-layers and a plurality of substrate layers which are arranged alternately in the layer stack. The dispersing agent may be removed at least partly by evaporation of the dispersing agent.

The base structure may be shaped in accordance with an intended shape of the layer stack.

According to a fifth aspect, a system for manufacturing an electrically heatable layer stack as presently described is provided. The system comprises a substrate lamination head configured for laminating a substrate onto a base structure to thereby form a substrate layer of the layer stack. The system further comprises a spraying device configured for spraying, onto the substrate layer, a dispersion comprising a dispersing agent and carbon nanotubes, CNTs, in dispersed state, so as to form, on the substrate layer, a CNT-layer configured to conduct an electric current. The substrate lamination head and the spraying device are further configured to facilitate spraying the dispersion at least partly in synchrony with laminating the substrate layer.

The system may further comprise a regulator for regulating a feeding of the dispersion to the spraying device.

BRIEF DESCRIPTION OF THE DRAWINGS

Further details, objects and advantages of the disclosure herein will become apparent from the drawings and the following detailed description.

DETAILED DESCRIPTION

Figure 1:
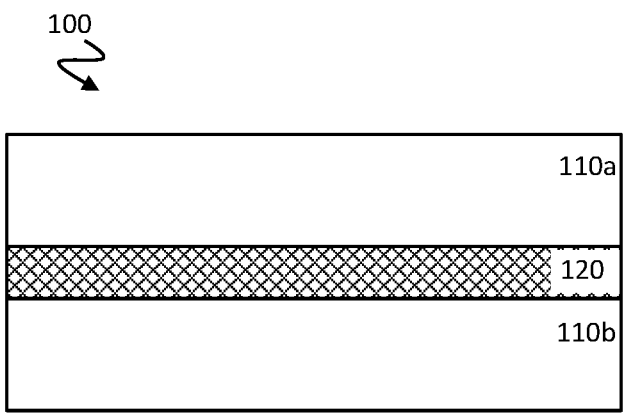
FIG. 1 is a schematic illustration of an electrically heatable layer stack according to an embodiment.

FIG. 1 shows an electrically heatable layer stack 100 according to an embodiment. The layer stack 100 comprises two substrate layers 110a, 110b and a carbon nanotubes-, CNT-, layer 120 arranged between the substrate layers 110a, 110b.

The substrate layers 110a, 110b are made of electrically insulating material. In the shown example, the substrate layers 110a, 110b comprise thermoplastic or thermoset polymer resin. However, the substrate layers 110a, 110b may also comprise other types of electrically insulating material. Furthermore, in the shown example, the substrate layers 110a, 110b have a thickness between 0.05 mm and 1.0 mm. However, other examples of the electrically heatable layer stack 100 comprise substrate layers having a thickness outside the aforementioned range, for example, less than 0.05 mm and/or more than 1.0 mm.

The CNT layer 120 comprises carbon nanotubes, CNTs, distributed over a plane of the CNT layer 120. The CNT layer 120 is further configured to conduct an electric current which may be applied to the CNT layer 120. In particular, the CNT layer 120 is configured to conduct an electric current which is applied at one side surface of the layer stack 100 towards another side surface, for example an opposite side surface, of the layer stack 100. In addition, the CNT layer 120 is configured to conduct the electric current such that the electric current flows, at least essentially, over an entire planar extension of the CNT layer 120. For that purpose, the CNT layer 120 comprises a mesh of CNTs extending substantially in the plane of the CNT layer 120. For example, the mesh of CNTs is produced by statistically distributing the CNTs over the top surface of the lower substrate layer 110b, wherein each CNT adopts a partly random orientation in the plane of the CNT layer 120. In that context, an areal or spatial density of the distributed CNTs is chosen with regard to an average length of each CNT such that a statistical redundancy in physical contacts between adjacent CNTs is achieved. In some examples, the creation of the redundant mesh is facilitated by the use of so-called 'entangled' CNTs. In the case of entangled CNTs, multiple CNTs have been connected to one another to thereby form a longer structure. Such longer structures increase the likelihood of intersection between neighboring CNTs and facilitate the forming of a regular mesh in the plane of the CNT layer 120.

The layers 110a, 110b, 120 of the layer stack 100 are configured to produce heating in at least one of the substrate layers 110a, 110b, when an electric current is applied to the CNT layer 120. The heating results mainly from remote Joule heating inside the insulating material of the substrate layers 110, 110b when a current flows through the adjacent CNT layer 120. The effect of remote Joule heating in connection with carbon nanotubes has been known for some time. In particular, it is known that remote Joule heating is caused in silicone comprising substrates when a current flows through a carbon nanotube in the vicinity of a substrate. Recent experiments confirmed the effect also for other substrate materials, such as polymer resins. In contrast to conventional electric heating, remote Joule heating does not cause an immediate heating of the electric conductor through which the current is flowing. Instead, remote Joule heating occurs in material, especially electrically insulating material, in the vicinity of the electric conductor. At the same time, the effect of remote Joule heating typically exceeds by far that of conventional heating in the electric conductor.

In the case of the layer stack 100, applying an electric current to the CNT layer 120 and the resulting current flow at least over essential parts of the plane of the CNT layer 120 will produce a pattern of heated areas in the adjacent substrate layers 110a, 110b corresponding to the mesh of CNTs through which the electric current is flowing. In combination with heat conduction within the substrate layers 110a, 110b and an appropriately chosen mesh size of the redundant mesh of CNTs, an even rise in temperature in a plane of each of the substrate layers 110a, 110b can be achieved. For example, the upper and the lower surface of the layer stack 100 can become evenly heated.

Figure 2:
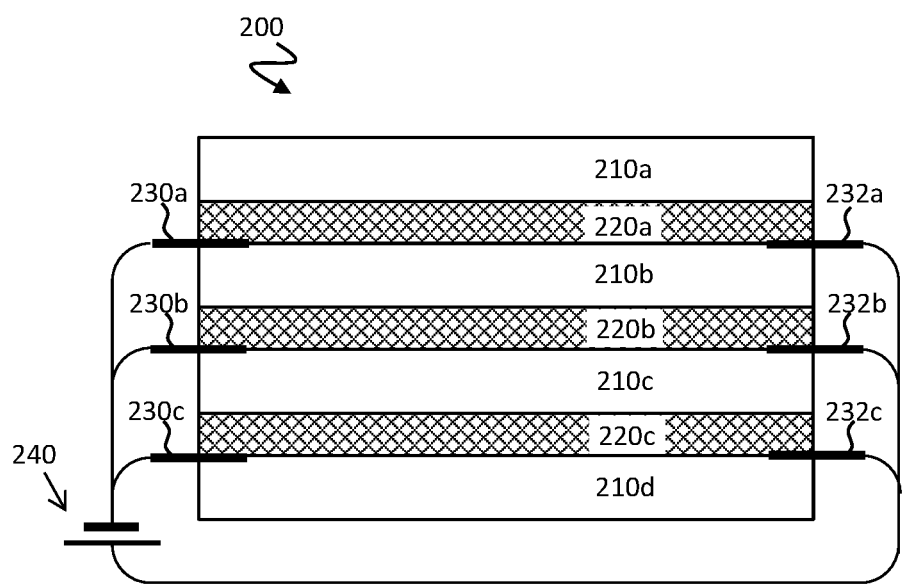
FIG. 2 is a schematic illustration of an electrically heatable layer stack according to a further embodiment.

FIG. 2 shows another embodiment of an electrically heatable layer stack 200. Similar to the layer stack 100 shown in FIG. 1, the layer stack 200 of FIG. 2 comprises a sub-stack of two substrate layers 210a, 210b with a CNT layer 220a sandwiched in between. Different from FIG. 1, however, the layer stack 200 comprises a plurality of CNT layers 220a, 220b, 220c, each of which is sandwiched between two substrate layers 210a to 210d, respectively. Meanwhile, for each sub-stack of a CNT layer and two adjacent substrate layers, the details set forth above in connection with FIG. 1 apply correspondingly. However, compared to the layer stack 100 of FIG. 1, due to the provision of multiple functional sub-stacks, the layer stack 200 of FIG. 2 is suited to produce higher temperatures, more effective heating and/or better control over the heating process.

The layer stack 200 further comprises electrodes 230a-230c, 232a-232c, each of which is connected to one of the CNT layers 220a to 220c. In the shown example, the electrodes 230a-230c, 232a-232c are shown partly embedded in the layer stack 200. Each electrode 230a-230c, 232a-232c is further connected to one of opposite poles of an electric current source 240.

In the shown example, the electrodes 230a-230c, 232a-232c are arranged at opposite side surfaces of the layer stack 200 and connected to the current source 240 such that parallel electric circuits are produced. Moreover, in the shown example, electrodes which are connected to the same pole of the current source 240 are arranged at the same side surface of the layer stack 200, respectively, thus causing identical flow directions of the electric current in each of the CNT layers 220a-220c. In other examples, however, other arrangements are chosen, in which flow directions of the electric current in neighboring CNT layers 220a to 220c differ from one another and/or at least some of the CNT layers are part of the same serial electric circuit.

Each of the electrodes 230a-230c, 232a-232c comprises an electro-conductive film which is at least partly embedded in the layer stack 200. For example, each of the CNT layers 220a to 220c has been formed partly on top of the electro-conductive film of the corresponding pair of electrodes. Further, to facilitate an electric current over a planar extension of each CNT layer, in some examples each of the electrodes 230a-230c, 232a-232c extends over the width of a side surface of the layer stack 200.

In some examples, the layer stack 200 further comprises a temperature sensor (not shown). The temperature sensor is configured to detect a temperature caused by the electrically heatable layer stack 200 when a current is applied to one or more of the CNT layers 220a to 220c. In some examples, the temperature sensor is a part of a control system for controlling a heating caused by the layer stack 200. In particular, a current applied to the CNT layers can be controlled based on a difference between an intended temperature and a temperature that is detected by the temperature sensor.

In further examples, the layer stack 200 comprises further layers in addition to those shown in FIG. 2. For example, the layer stack 200 may comprise more than three functional sub-stacks. In some examples, the layer stack 200 comprises further substrate layers without a CNT-layer in between. In some of these examples, the layer stack 200 is a laminate of substrate layers, for example a laminate of polymer resin, whereas only at some selected heights within the laminate a CNT layer has been inserted.

Figure 3:
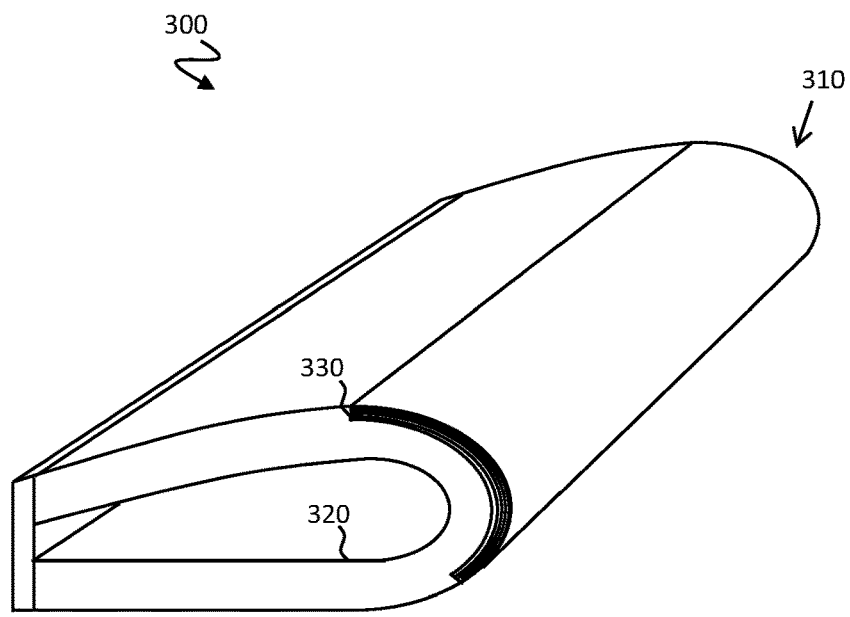
FIG. 3 is a schematic illustration of a vehicle assembly group comprising an electrically heatable layer stack, according to a further embodiment.

FIG. 3 shows a vehicle assembly group 300 according to an embodiment. The vehicle assembly group 300 comprises an electrically heatable layer stack 330 as presently described. In the shown example, the vehicle assembly group 300 comprises parts of a wing of an aircraft, especially parts of a skin 320, of the aircraft. In the vehicle assembly group 300, the electrically heatable layer stack 330 is further arranged in a region of the vehicle assembly group 300 that corresponds to a leading edge 310 of the wing. However, in other examples, the vehicle assembly group 300 is an assembly group of a different type of vehicle or comprises parts of a different section of an aircraft, for example, parts of a fuselage or a tail fin of an aircraft.

As shown in FIG. 3, the layer stack 330 is arranged along the leading edge 310 at an outside portion of the skin 320. In that way, the layer stack 330 provides heat directly in those parts where de-icing or anti-icing is required. In comparison to conventional techniques, it is therefore not necessary to heat the entire thickness of the skin 320 from inside the wing 300. The layer stack 330 thus provides efficient heating of the relevant parts of the aircraft.

In addition, if polymer resin is used as the substrate layers in the layer stack 330, requirements regarding wear and durability can easily be met. In particular, the substrate layers in the layer stack 330 may be formed by the same lamination tape, which is also used to build up the skin 320. For example, as the above in connection with FIG. 2, the layer stack 330 may be produced during the conventional laminating process when manufacturing the wing skin 320, by additionally including CNT-layers at the required positions between two conventional plies of the polymer laminate. In the described context, heating of up to 100° C. may be required, depending on individual conditions and purposes. Accordingly, the number of CNT layers in the stack 330 can be chosen differently in different examples.

A typical thickness of a single ply in the laminate of a wing skin 320 lies within the range from 0.15 mm to 3 mm. This corresponds to the preferred thickness of the substrate layers in the layer stack 330, which ranges between 0.05 mm and 0.5 mm. Moreover, embedding the layer stack 330 into the aircraft skin 320 as described above is also not hindered by the typically decreasing thickness of the skin 320 from the base towards the tip of the wing, for example, from about 10 mm at the base to about 2 mm at the tip. For, efficient heating by the layer stack 330 can be achieved with stack heights far less than these thicknesses. Moreover, the laminate forming the skin 320 is typically manufactured starting from an outside of the skin 320, whereas a varying skin thickness is obtained by applying more or less plies to the different regions. The variation in ply numbers thus causes irregularities only at an inside of the skin 320 whereas at the outside, i.e., in the portion where the layer stack 330 is arranged, plies extend regularly over the entire relevant length.

The electrically heatable layer stack as presently described thus allows for an efficient implementation in the skin of an aircraft or any other vehicle structure. At the same time, the electrically heatable layer stack does not require space consuming or ponderous installations.

The layer stack 330 can be connected to an electric system of the aircraft. Additionally, in some examples, the layer stack 330 can be connected to an electric control system of the aircraft so as to control a current in the CNT layers and a resultant heating temperature at a leading edge 310 of the wing 300. In one example, the layer stack 330 is connected to the electric system such that a current flow is directed in a horizontal direction in all CNT layers, for example, from the base towards the tip of the wing 300.

Figure 4:
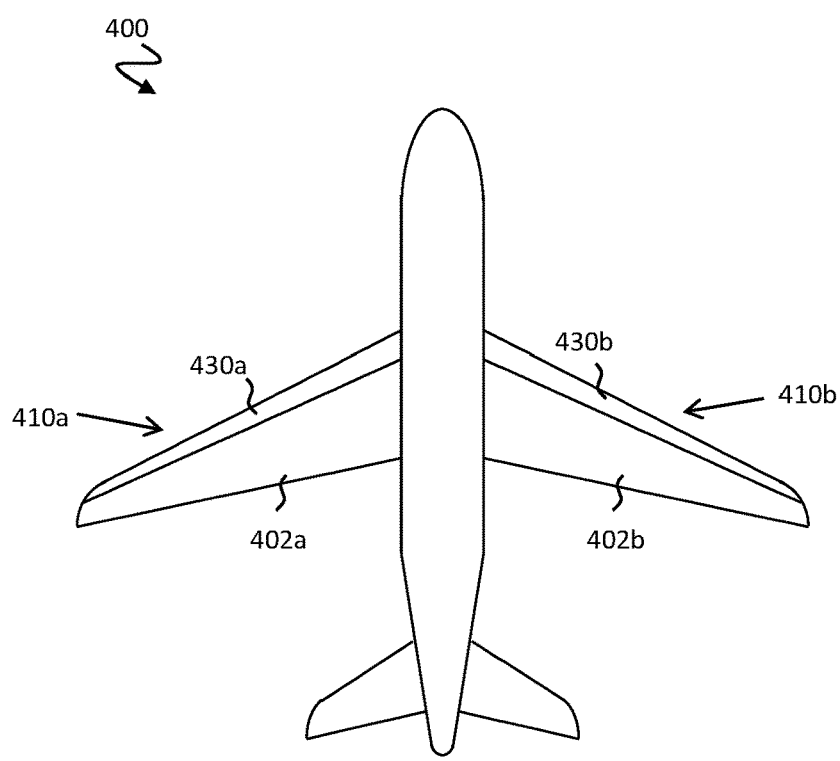
FIG. 4 is a schematic illustration of an aircraft comprising a vehicle assembly group, according to a further embodiment.

FIG. 4 shows an aircraft 400 according to an embodiment. The aircraft 400 comprises two aircraft assembly groups 402a, 402b, each of which comprises at least parts of a wing of the aircraft 400. In each of the aircraft assembly groups 402a, 402b, the aircraft 400 further comprises an electrically heatable layer stack 430a, 430b arranged in a region that corresponds to a leading edge 410a, 410b of the respective wing of the aircraft 400.

With regard to each of the electrically heatable layer stacks 430a, 430b and each of the aircraft assembly groups 402a, 402b, the details as set forth above in connection with FIGS. 1 to 3 apply correspondingly.

Figure 5:
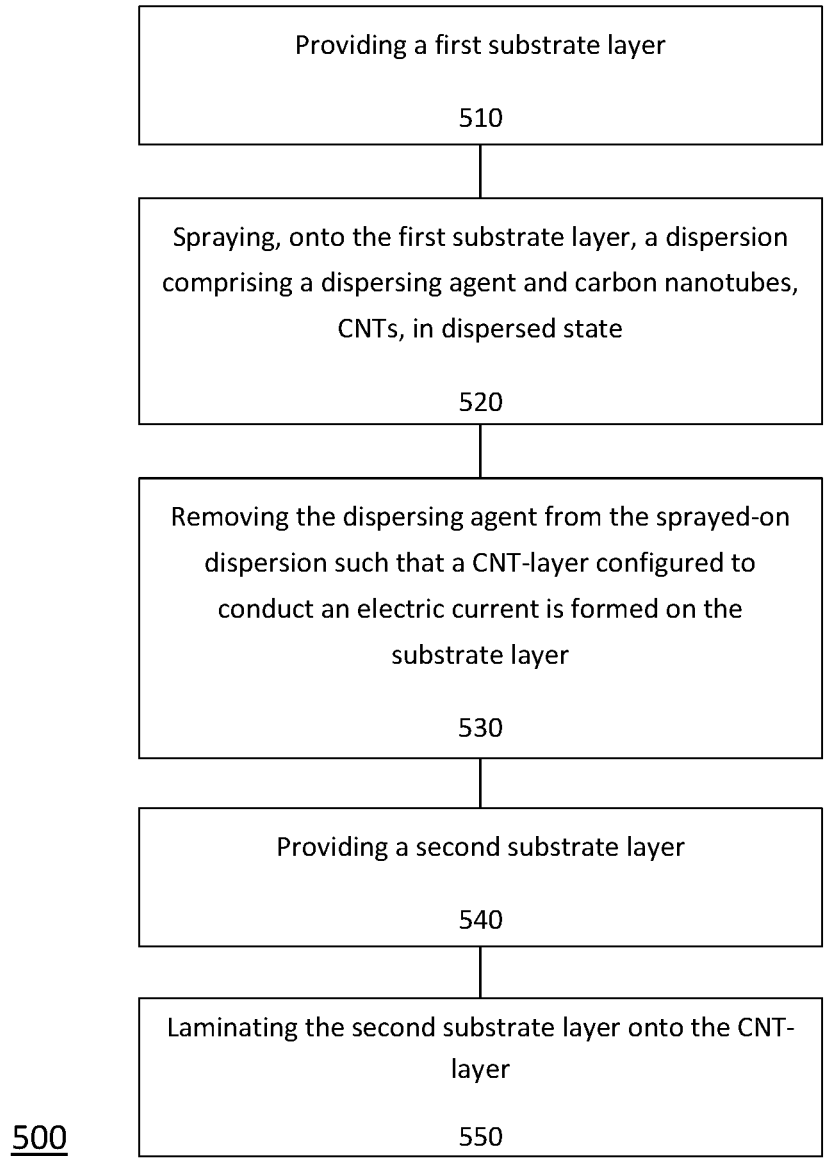
FIG. 5 is a flow diagram of a method for manufacturing an electrically heatable layer stack, according to a further embodiment.

FIG. 5 shows a flow diagram of a method 500 for manufacturing an electrically heatable layer stack as presently described. The method 500 comprises providing a first substrate layer, step 510. Providing the first substrate layer may be done, for example, in the context of a lamination process. The method 500 further comprises spraying onto the first substrate layer a dispersion comprising a dispersing agent and carbon nanotubes, CNTs. The carbon nanotubes are contained in the dispersion in a dispersed state, for example, dispersed by the dispersing agent, step 520. After spraying the dispersion, the method 500 includes removing the dispersing agent from the sprayed-on dispersion, step 530. In that way, a CNT layer is formed on the substrate layer. In that context, characteristics of the CNTs, the dispersion, and parameters of the spraying and removing steps are chosen such that the formed CNT layer is configured to conduct an electric current in the plane of the CNT layer, as described above. The method 500 further comprises providing a second substrate layer, step 540, and laminating the second substrate layer onto the CNT layer, step 550.

In some examples, the method 500 further comprises, subsequent to providing the first substrate layer, step 510, laminating the first substrate layer onto a base structure. As described in connection with FIGS. 2 and 3, the base structure may be a previously fabricated sub-stack of a laminate or a previously fabricated sub-stack of an electrically heatable layer stack, as presently described. Alternatively, the base structure can be a part of a mold which is used to give a particular shape to the layer stack, for example, a curved profile according to an aircraft wing's leading edge, as shown in FIG. 3. In some examples, the spraying step 520 is further performed in synchrony with laminating the first substrate layer.

Figure 6:
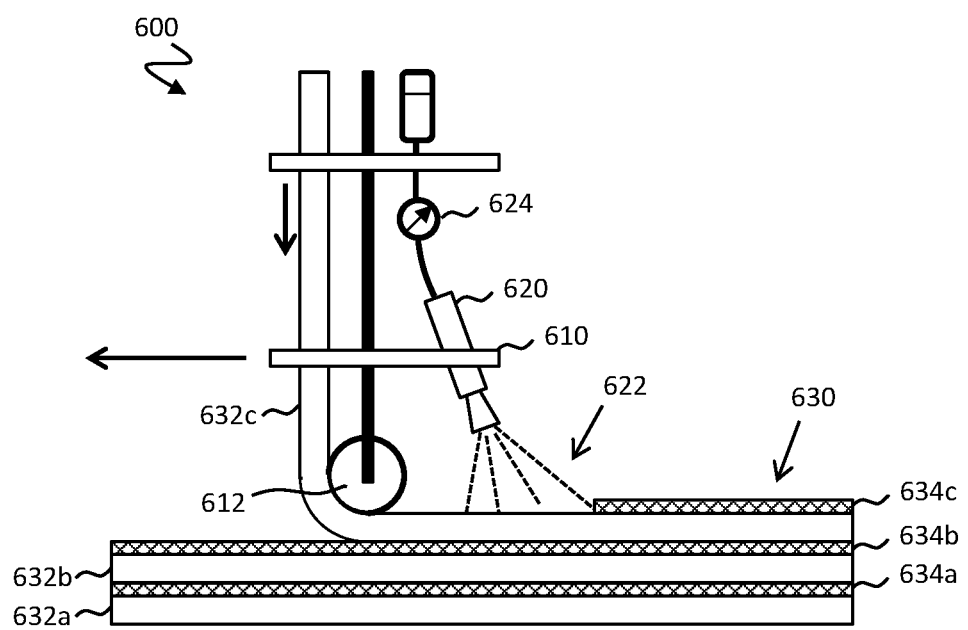
FIG. 6 is a system for manufacturing an electrically heatable layer stack, according to a further embodiment.

FIG. 6 shows an example of a system 600 for manufacturing an electrically heatable layer stack 630 of the above described type. The system 600 comprises a lamination head 610, 612 configured for laminating a substrate 632c onto a base structure 632a, 632b, 634a, 634b to thereby form a substrate layer 632c of a layer stack 630. Concerning its functionality for laminating the substrate layer 632c onto the base structure, the laminating head 610, 612 may be implemented in accordance with known techniques.

The system 600 further comprises a spraying device 620 configured for spraying a dispersion 622 comprising carbon nanotubes, CNTs, onto the substrate layer 632c. The dispersion 622 is fed to the spraying device 620, for example, from a reservoir. The system 600 further comprises regulator 624, such as a valve, to regulate the feeding of dispersion to the spraying device 620. In that way, the application of a CNT layer 634c on the laminated substrate layer 632c can be controlled and/or suspended. The system 600 is configured to be moved relative to the base structure 632a, 632b, 634a, 634b during a lamination process.

The system 600 allows for a synchronous placing of a substrate layer 632c and creating of a CNT layer 634c on top of the substrate layer 632c. In that way, efficient production of an electrically heatable layer stack as presently described is facilitated. It permits in particular the selective inclusion of heatable portions within a laminate without interrupting a laminating process and without the necessity for additional manufacturing sites. In particular, the system 600 provides for efficient structure for creating an electrically heatable layer stack embedded in a skin of an aircraft wing, as described in connection with FIG. 3. In that context, the use of thermoplastic polymer resins in the production of a skin of the aircraft brings about temperatures in the lamination process of about 400° C. Such processing temperatures support a fast evaporation of the dispersing agent in the dispersion 622. Accordingly, the dispersion 622 typically will have dried, and the CNT-layer 634c will have formed, within a repetition interval of the lamination process, that is, before the next ply will be laminated onto the stack 630.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrically heatable layer stack, comprising:
   at least two substrate layers;
   a plurality of carbon nanotubes (CNT) layers, each of the CNT-layers configured to conduct an electric current; and
   at least one electrode configured for applying an electric current to a corresponding CNT-layer of the plurality of CNT-layers, wherein at least a portion of the at least one electrode is sandwiched between one substrate layer and one of the plurality of CNT-layers, wherein the at least one electrode extends beyond an edge of the electrically heatable layer stack and the at least one electrode is adjacent to both the plurality of CNT-layers and the one substrate layer;
   wherein the substrate layers and the plurality of CNT-layers are configured to produce heating of at least one of the substrate layers when an electric current is applied to the one of the plurality of CNT-layers;
   wherein the substrate layers and the CNT-layers are arranged alternately in the layer stack.

2. The electrically heatable layer stack according to claim 1, wherein the substrate layers and the CNT-layers are configured to produce the heating at least by remote Joule heating in the at least one of the substrate layers.

3. The electrically heatable layer stack according to claim 1, wherein the each of the CNT-layers comprise a mesh of mutually crossing carbon nanotubes, CNTs, which extend in a plane of each of the CNT-layers.

4. The electrically heatable layer stack according to claim 1, wherein the substrate layers comprise electrically insulating material.

5. The electrically heatable layer stack according to claim 1, wherein the substrate layers comprise polymer resin.

6. The electrically heatable layer stack according to claim 5, wherein the polymer resin is a thermoplastic resin.

7. The electrically heatable layer stack according to claim 1, wherein a thickness of the substrate layers lies within a range from 0.05 mm to 1.0 mm.

8. A vehicle assembly group, comprising an electrically heatable layer stack, the electrically heatable layer stack comprising:
   at least two substrate layers;
   a plurality of carbon nanotubes (CNT) layers, each of the CNT-layers configured to conduct an electric current; and
   at least one electrode configured for applying an electric current to a corresponding CNT-layer of the plurality of CNT-layers, wherein at least a portion of the at least one electrode is sandwiched between one substrate layer and one of the plurality of CNT-layers, wherein the at least one electrode extends beyond an edge of the electrically heatable layer stack and the at least one electrode is adjacent to both the plurality of CNT-layers and the one substrate layer;
   wherein the substrate layers and the plurality of CNT-layers are configured to produce heating of at least one of the substrate layers when an electric current is applied to the one of the plurality of CNT-layers;
   wherein the substrate layers and the CNT-layers are arranged alternately in the layer stack.

9. The vehicle assembly group according to claim 8, wherein the vehicle assembly group is an aircraft assembly group.

10. The vehicle assembly group according to claim 9, wherein the vehicle assembly group comprises at least parts of a wing of an aircraft, and the electrically heatable layer stack is arranged at least partly in a region corresponding to a leading edge of the wing of the aircraft.

11. An aircraft, comprising a vehicle assembly group according to claim 8.

* * * * *